(12) United States Patent
Fitch

(10) Patent No.: US 9,953,505 B1
(45) Date of Patent: Apr. 24, 2018

(54) TIME AND TEMPERATURE BAND

(71) Applicant: Charissa Thornton Fitch, Dallas, TX (US)

(72) Inventor: Charissa Thornton Fitch, Dallas, TX (US)

( * ) Notice: Subject to any disclaimer, the term of this patent is extended or adjusted under 35 U.S.C. 154(b) by 0 days.

(21) Appl. No.: 15/431,183

(22) Filed: Feb. 13, 2017

Related U.S. Application Data

(60) Provisional application No. 62/296,706, filed on Feb. 18, 2016.

(51) Int. Cl.
| | |
|---|---|
| *G08B 17/00* | (2006.01) |
| *G08B 21/02* | (2006.01) |
| *G08B 21/18* | (2006.01) |
| *A23C 3/00* | (2006.01) |

(52) U.S. Cl.
CPC .............. *G08B 21/02* (2013.01); *A23C 3/00* (2013.01); *G08B 21/182* (2013.01)

(58) Field of Classification Search
CPC .............................. G08B 21/02; G08B 21/182
USPC ................................................. 340/584–589
See application file for complete search history.

(56) References Cited

U.S. PATENT DOCUMENTS

| | | | | |
|---|---|---|---|---|
| 8,855,311 | B1 * | 10/2014 | Clement | H04W 40/24 370/336 |
| 8,928,234 | B2 * | 1/2015 | Kim | F21V 33/00 315/193 |
| 2002/0067262 | A1 * | 6/2002 | Lie | A47G 29/1214 340/569 |
| 2008/0279729 | A1 * | 11/2008 | Chen | A61L 9/127 422/123 |

* cited by examiner

*Primary Examiner* — Ojiako Nwugo
(74) *Attorney, Agent, or Firm* — Stephen J. Stark; Miller & Martin PLLC

(57) ABSTRACT

A time and possibly a temperature device connects to a container with a band extending circumferentially around a portion of the container. The device has an input, a processor and a display permitting a countdown timer to be initiated relating to a status of goods in the container. For some embodiments, if temperature exceeds set ranges for specific times, step reductions, such as 10% or more can be deducted from the remaining time. The display can provide an indication of the status of the material in the container, and some embodiments provide for remote alerting to a remote communications device, such as a phone.

17 Claims, 5 Drawing Sheets

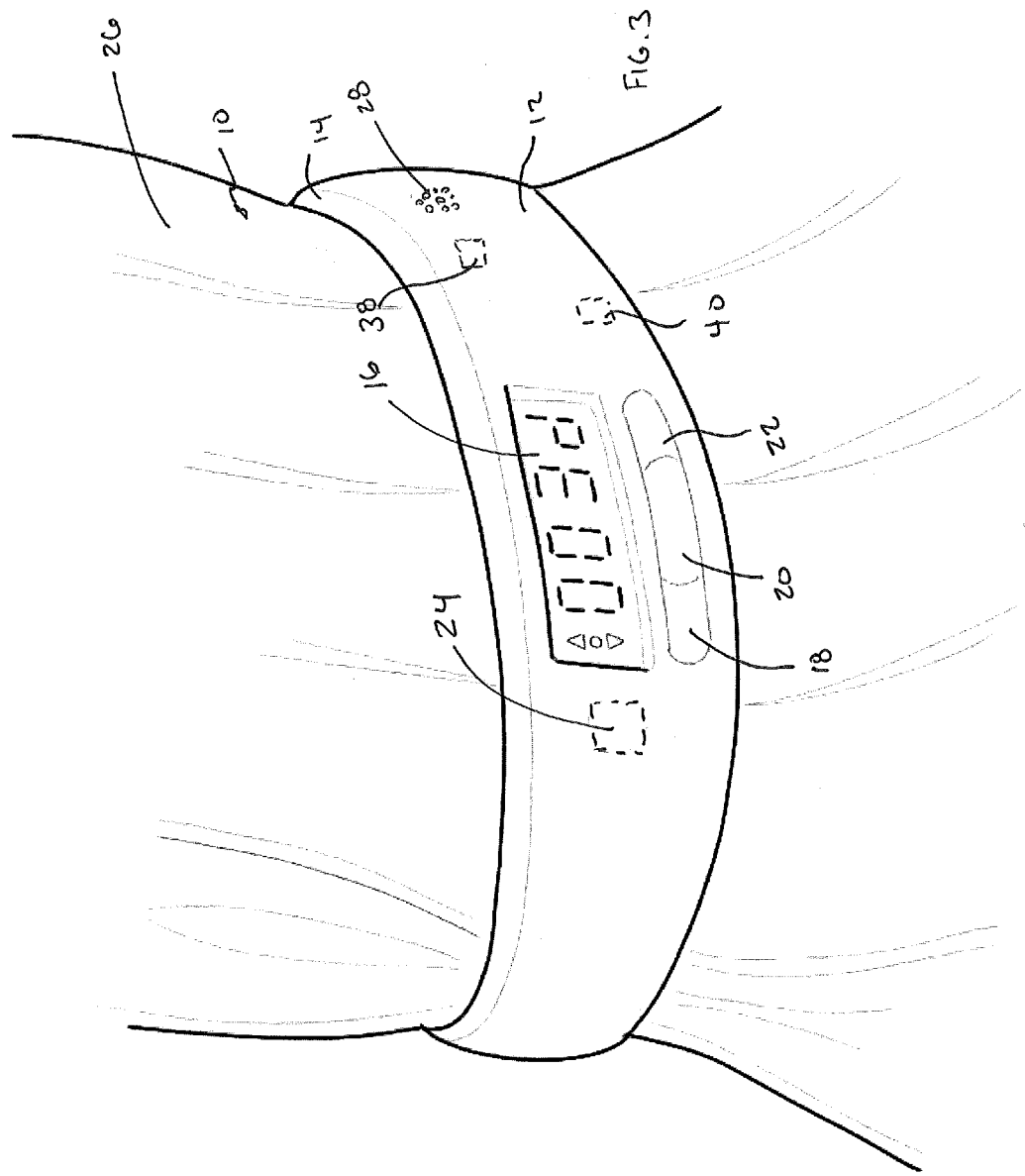

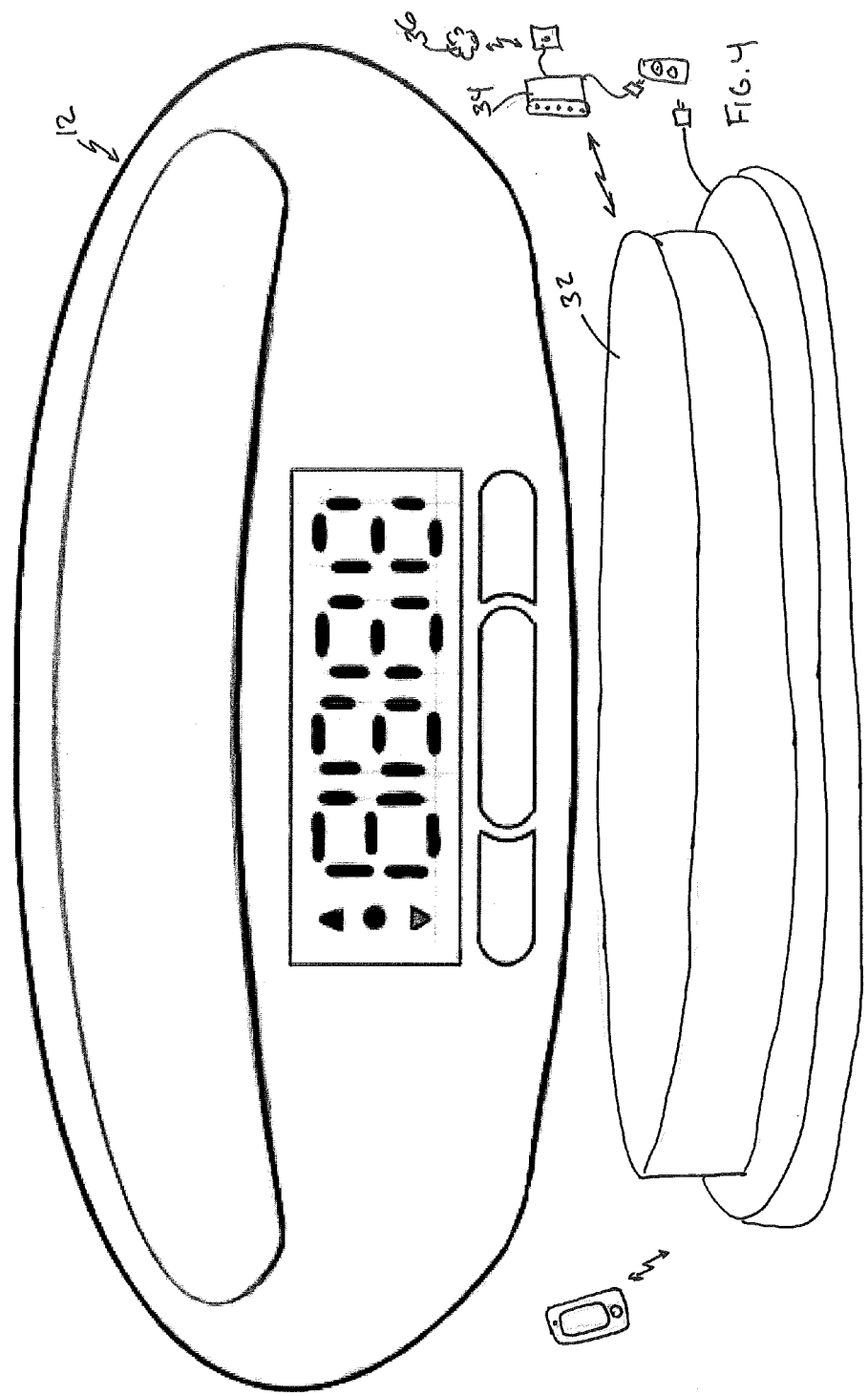

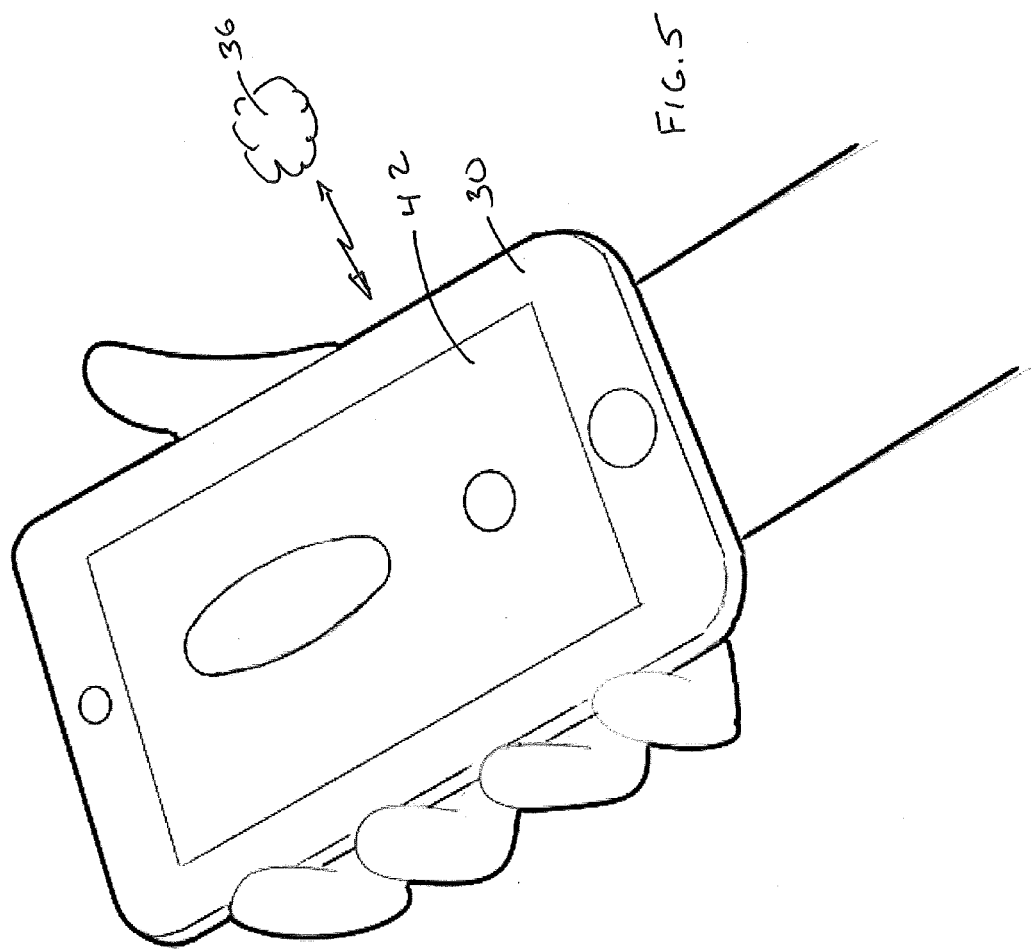

TIME AND TEMPERATURE BAND

CLAIM OF PRIORITY

This application claims the benefit of U.S. Provisional Application No. 62/296,706, filed on Feb. 18, 2016, which is incorporated herein by reference in its entirety.

FIELD OF THE INVENTION

The present invention relates to identifying the status of certain material in containers, whether material such as, for example, breastmilk is within the CDC guidelines for being properly handled below certain temperatures for less than certain times, and/or an amount of time that has passed since a container were last utilized (such as a vitamin or other container) to assist in providing directed dosage at desired intervals.

BACKGROUND OF THE INVENTION

The Center for Disease Control publishes guidelines on the proper handling and storage of human milk as adopted from the 2004 Clinical Protocol #8: Human Milk Storage Information for Home Use for Healthy Full Term Infants published by the Academy of Breastfeeding Medicine. For instance, breastmilk may be kept at room temperature (up to 77F) for 6-8 hours, in an insulated cooler bag at less than 39F for up to 24 hours, in a refrigerator at less than 39F for up to 5 days. If frozen, at 5F or less, up to 2 weeks, if at 0F or less, for 3-6 months, or if −4F or less, 6-12 months.

However, after pumping breastmilk and writing the time and date of filling the container, there is no easy way to track time, much less the temperature of the container and its contents.

Other types of food have other published guidelines for cooled storage, such as eggs (4-5 weeks at 39F or below), hamburger meat (1-2 days at 39F or below, or 3-4 months at 0F or below), etc. as published by the Food and Drug Administration and the Food Safety website.

Accordingly, there is believed to be a need to track storage conditions of materials needing time and/or temperature tracked with improved technology.

SUMMARY OF THE INVENTION

Accordingly, it is an object of many embodiments of the present invention to provide a band and/or wrap which can be attached to and removed from a container to assist in providing an indication as to the state of the material in the container, such as being within our outside of guidelines and/or ranges which fall within guidelines and/or available or unavailable for use, etc.

It is another object of many embodiments of the present invention to provide a band which can communicate, such as with a remote communication device like a cell and/or smart phone to identify a state of contents in a container whether within or outside of guidelines and/or available or unavailable for use, etc.

It is yet another object of many embodiments to provide a countdown timer, possibly in conjunction with a temperature algorithm to track status of contents of a container, possibly in communication with a remote communication device, such as in the form of a band or otherwise connected to the container.

It is another object of at least some embodiments of the present invention to provide a device having at least some of an input, display and or alarm indication whereby a timer can countdown either from a time selected, entered, and/or at least partially calculated by the device. Should the timer count down to zero, an alarm and/or other condition can be displayed or otherwise indicated, possibly including through communication to a remote communication device advising of the condition.

It is another object of the present invention for temperature(s) of the device to be monitored, and possibly sense the temperature to assist in computing or directing a remaining amount of time to be counted, such as if the device is known to be, or going to be, in the refrigerator, providing various selected options to the user, such as breastmilk, and/or 5 days, or hamburger meat, and/or 2 days, etc. If the device will be, or is, in a freezer, then providing various options based thereon may be an option for at least certain embodiments as well.

Some embodiments may be useful to assist users in performing an action (such as taking certain medication) or not taking an action (if a certain amount of time has not elapsed since a last usage, etc.), possibly by sending an indication to a remote communications device, such as a remote communications device advising that the appropriate time has lapsed and it is time.

Temperature ranges can potentially be provided to the device so that alarm indications are provided if ranges or specifications are exceeded. For instance, if a device is to be at 39F or lower, then the device may alarm if temperature rises above 39F for more than 2 hours, more than 49F for one hour, etc. Step reductions in time remaining could also occur as a material remains outside of a specified range for a period of time, such as an initial decrease of 10% of time remaining if outside of a first range for a first time, a 20% drop if outside the first range for a second time, a 30% drop if outside of a second range for a third time, etc. Different set points could be utilized as set by the manufacturer and/or user whether an item is deemed too hot or even too cold to provide alarm conditions and/or downwardly adjust the remaining time being count down.

By pairing a device with a remote communication device such as a cell or smart phone or tablet in one of a variety of ways, the device can communicate data with the remote communication device to alert a user as to a change in condition of the contents of the container the device is monitoring.

Inputs for the device may allow for the entry of a first time to be count down, a selection of pre-entered times, and/or even merely telling the timer to begin counting down. A processor can monitor temperature while the device is counting down. A display can show time remaining on the count down from the first time. A green light may indicate that material within a container is within specification. A red light may indicate that material within the container is out of specification. The display may flash the number 00:00 or other appropriate indication when the first time has elapsed as an option as well. Alarms may be audible at the container and/or communicated to the remote communication device either directly or through a hub which could also be a recharging station for the device.

The device may have a resilient band to connect the device to a container or the band may be comprised of malleable arms which can wrap and retain the device to a container, such as a breastmilk bag from a pumping unit, or other appropriate container. The band is anticipated to circumnavigate at least a portion of the container in an installed configuration.

BRIEF DESCRIPTION OF THE DRAWINGS

The particular features and advantages of the invention as well as other objects will become apparent from the following description taken in connection with the accompanying drawings in which:

FIG. 3 is perspective detailed view of the device shown in FIG. 2;

FIG. 4 is a front perspective and schematic view of the device shown in FIGS. 2 and 3 together with a hub and communication options;

FIG. 5 is a front perspective and schematic view of a remote communication device receiving data and displaying an alert relative to the device of FIGS. 2-4.

DETAILED DESCRIPTION OF THE PREFERRED EMBODIMENT

Figure 1:
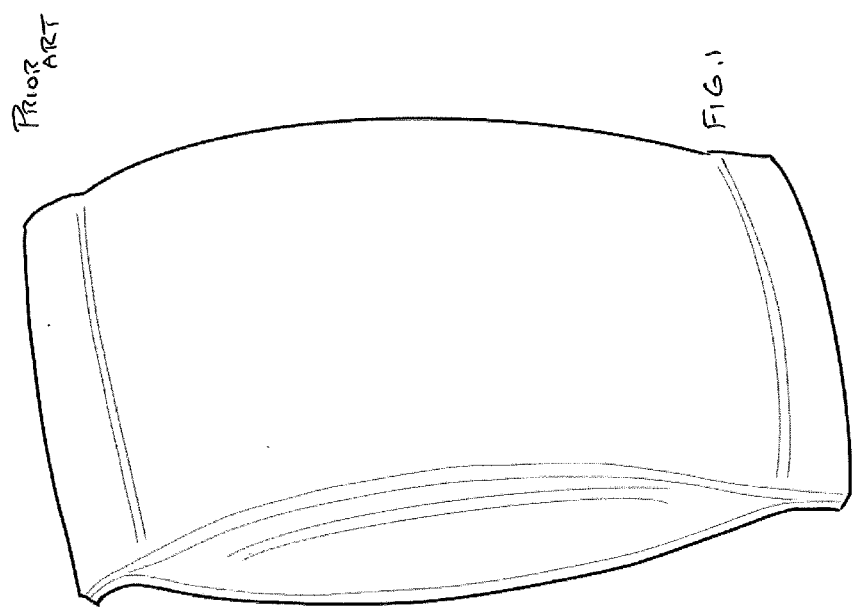
FIG. 1 is a side perspective view of a prior art container used when pumping breastmilk.

FIG. 1 shows a prior art container for breastmilk which is a breastmilk bag as is commonly used when pumping breastmilk.

Figure 2:
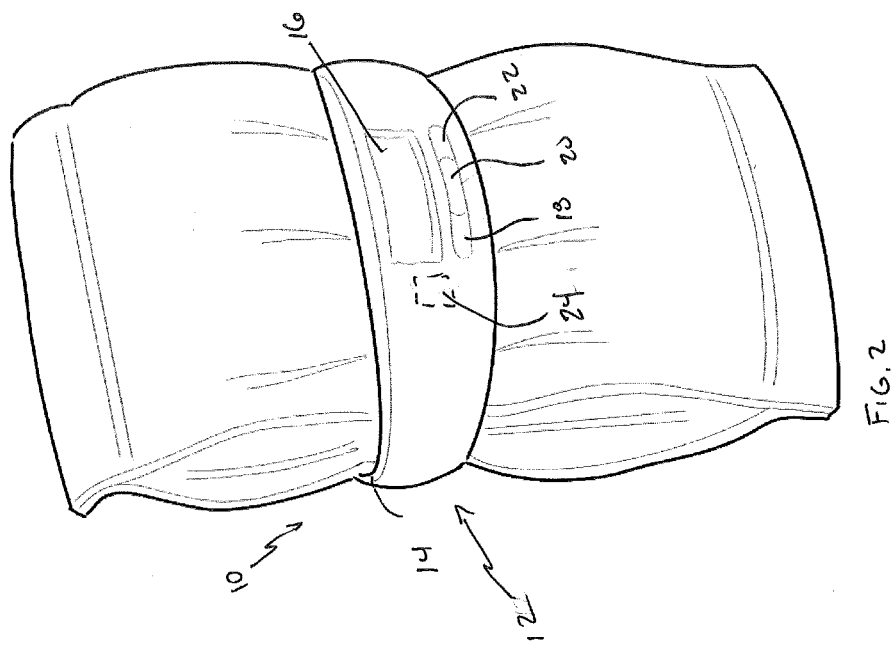
FIG. 2 is a side perspective view of the container of FIG. 1 with a presently preferred embodiment of a device of the present invention connected thereto.

FIG. 2 shows a container 10 having a device 12 of a presently preferred embodiment of the invention circumscribing a perimeter of a portion of the container 10. Specifically, the device 12 has a band 14. Band 14 preferably provides a continuous perimeter about the container as shown, or even about material itself to be monitored, such as a resilient band which may be constructed of an elastomeric material of two or other number of sizes.

Other embodiments of bands could provide a watch band style structure being adjustable in length, i.e., perimeter size to circumnavigate a portion of the container 10. A wire band, or malleable style material such as a metal or other appropriate material may be used where the band 14 wraps about a portion of the container 10 in one of a variety of ways as would be understood by those of ordinary skill in the art. Multiple colors could be provided to assist in quickly identifying which band 14 was on which container 10. Tamper evident bands 14 could be utilized with these or other embodiments.

Some embodiments of devices 10 may have other constructions and/or perform different functions. For instances, some embodiments of devices 10 may connect to containers 10 in other manners with different constructions for a band 14, or even without a band 14. Some embodiments may provide a device 12 which connects to a container 10 in one of a variety of manners such as with hook and loop style connections, adhesives, such as like a two sided adhesives or otherwise, or through other connection systems.

The device 12 of the preferred embodiment further provides a display 16, at least one input, shown as inputs 18,20,22 and a processor 24. The display 16 is shown with a display direction oriented perpendicularly to a direction of the band 14. The band 14 proceeds rearwardly relative to the display 16. The device 12 for many embodiments is reusable. The device 12 can be used with a first container 10, and then removed and put on another container 10.

The band 14 connects and/or retains the device 12 to the container 10. The band 14 circumnavigates at least a portion of the container 10 when installed.

At least one of the input(s) 18,20,22 is utilized to begin the processer 24 to countdown a first time displayed on the display 16. The first time relates to a status of material 26 located within the container 10 such as the breastmilk illustrated. The display 16 may then display an amount of time remaining relative to the first time (less the elapsed time). The display 16 may possibly display a green light (or other indication) showing that the material 26 is within specification or a red light (or other indication) showing that the material 26 is outside of specification as a status of the material stored within the container. Other status indicators could also be provided with other embodiments, including, but not limited to flashing lights such as 00:00 on the display 16 or other indication when out of specification and/or the first time has fully elapsed. The status could also display the time remaining on the display 16.

The first time may be programmed into the device 12, or it could be input or selected with the input(s) 18,20,22 such as by selecting from pre-selected options, identifying the type of material 26 and/or its anticipated environment, and/or manually inputting a desired countdown time (direct entry) and then initiating the countdown with at least one of the input(s) 18,20,22. First time could take on a variety of formats, whether it be days and hours, hours and minutes, and/or other possible formats.

Audible alarms such as from speaker 28 could be provided when a material 26 becomes out of specification. Other alarms could be provided at the device 12 and/or remotely such as to a remote communications device 30, such as a smart phone, cell phone, tablet, computer or other device as would be understood by those of ordinary skill in the art. Various methods of communicating with the remote communications device 30 may be used, such as, but not limited to RFID, Bluetooth, NFC, WiFi or other system, whether through a hub 32 or otherwise.

For instance, as shown in FIG. 4, the device 10 could provide data to the hub 32 such as through Bluetooth or otherwise which could then be communicated through a router 34 wired or wirelessly to the cloud 36, internet, and/or other communications system, to then be communicated to the remote communications device 30 if not communicated directly.

The device 10 preferably has a temperature sensor 38 which can sense temperature and possibly display temperature on the display 16, possibly in a rotating manner, or otherwise, with remaining time or other information so that temperature is at least selectively displayed on the display 16.

Using the sensor 38, the processor 24 can ascertain if sensed temperature is outside of a first range for a period of time, such as a second period of time. This could cause an alarm and/or a step decrease, such as at least a 10% step decrease (as distinguished from counting down time), a second decrease, such as at least a 20% decrease could occur if outside of the first range, or a second range, for a third period of time, etc. Accordingly, as the temperature the material 26 is not as expected, the remaining life of the material 26 may be adversely affected and thus the remaining time reduced in a step-wise manner.

The device 12 will be run on a battery 40 which could be recharged by locating the device 12 on the hub 32 or other conventional or new charging methods. Battery life could be displayed on the display 16, and if certain conditions are met, a battery warning could be displayed on the display 16 and/or remotely to the remote communications device 30. One condition could be that the battery life is insufficient for the time displayed. Other conditions might also be provided.

A screen 42 of the remote communications device 30 can display information and/or alarms. Audible warnings could also be provided at the remote communications device 30.

It is anticipated that the material 26 may be human breastmilk for many embodiments and that the initial first time may be three days at less than forty degrees Farenheit which is currently within the FDA guidelines. Other materials 26, whether they be vitamins, food products or other products may have other times for this or other storage condition.

The processor 24 and/or hub 32 or other components could store time and/or temperature history. Some embodiments may have GPS position or other tracking capability. An inventory list may be provided, such as to allow the first times to be sorted by name, expiration date, location, last check in, etc. Freeze cycles, including warnings may be provided with certain embodiments, as well as other inventory management capabilities.

Some embodiments may use the device 12 to advise when consumption of material 26 can occur (as opposed to when it should not) as described above. For instance, if a vitamin or other material 26 is consumed at 12 hour intervals, the device 12 could be reset at 12 hour intervals and when an alarm is indicated, the user would know it was time to take another portion of the material 26.

Figure 6:
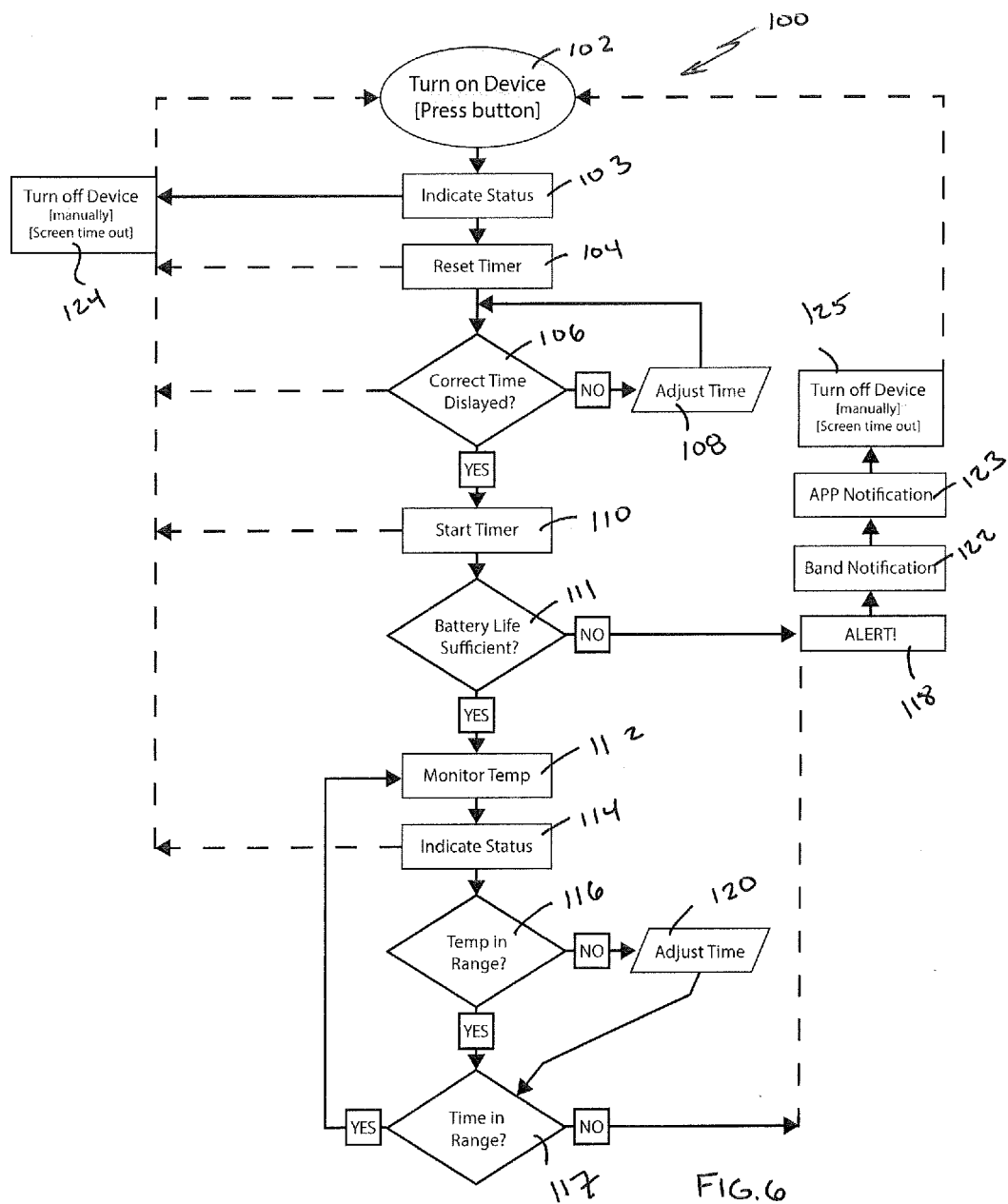
FIG. 6 is a flowchart showing operation of the components shown in FIGS. 2-5.

FIG. 6 provides a rudimentary flowchart 100 showing the methodology of operation of the device 12. First the device 12 can be turned on at step 102. A status could display at step 103. A timer could be reset at step 104 in a variety of ways to set the first time as described above or otherwise.

If the display 16 and/or screen 42 of the remote communications device 30 has the correct first time, count down can be started by activing the input 18,20,22 or otherwise at step 110. If the first time displayed is incorrect, it can be adjusted as described above or otherwise at step 108.

The countdown can start at step 110. Meanwhile temperature can be monitored at step 112 through sensor 38. A status can be displayed at the screen 42 and/or on the display 16. If time and/or temperature are out of specification at one of steps 116 or 117, an alarm may be provided at step 118, possibly coupled with a step reduction, such as at least 10% of the remaining time at step 120. A battery life remaining test could be performed at step 111 to potentially alarm at step 118 as well for some embodiments. Finally, time may expire and data can be sent at step 122 and/or to provide a notification to one or both of the band at step 122 and/or the remote communications device at step 123. Of course, the device 12 can be turned off at least at one of steps 124 or 125 such as if the material 26 is consumed, and/or for other reasons.

Having thus set forth the nature of the invention, what is claimed herein is:

1. A method of communicating the status of a contained item
comprising the steps of:
a) providing a reusable device having an input, a processor, a display and an integrated band, said band being one of a resilient material having a predetermined inner circumference, an adjustable length band, and a malleable material band retaining shape once bent about the container, said band extending rearwardly of the display to circumnavigate a container to which the device is connected with the band extending perpendicularly to a display direction of the display, and a temperature sensor;
b) connecting the device to the container by circumnavigating the container with the band to retain the device to the container;
c) directing the processor through the input to initiate a countdown timer of a first time which relates to a status of material stored within the container;
d) identifying a status of the material stored within the container on the display; and
e) determining if sensed temperature is at least within a first range for a second time, and alarming if outside of the first range, and if the device determines sensed temperature is outside of the first range for a second time, then downwardly adjusting time remaining on a countdown clock by at least 10%.

2. The method of communicating of claim 1 wherein the status is displayed as time remaining.

3. The method of communicating of claim 1 wherein the status is displayed as a flashing status.

4. The method of communicating of claim 3 wherein flashing status further comprises a green if the material is within specification, and a red if the material is out of specification.

5. The method of communicating of claim 1 further comprising the step of alarming if the first time has elapsed.

6. The method of communicating of claim 1 further comprising the step of displaying flashing on the display when the first time elapses.

7. The method of communicating of claim 1 wherein the device further comprises a temperature sensor, and further comprising the step of at least selectively displaying temperature of the device on the display.

8. The method of communicating of claim 1 wherein the input coordinates the countdown of the first time, and said first time is preset into the processor.

9. The method of communicating of claim 1 wherein the input permits selection of the first time from preset possibilities provided by the processor.

10. The method of communicating of claim 1 wherein the first time is at least partially based on the material within the container.

11. The method of communicating of claim 1 wherein the input permits direct entry of the first time into the processor.

12. The method of communicating of claim 1 further comprising the processer evaluating a status of battery life and if meeting predetermined conditions, displaying a battery warning on the display.

13. The method of communicating of claim 1 wherein the device further comprises an audible alarm, said audible alarm activated upon expiration of the first time.

14. The method of communicating of claim 1 further comprising the step of wirelessly transmitting data from the device to a remote communication device whereby a screen of the remote communication device displays the status of the material in the container.

15. The method of communicating of claim 14 wherein the data is transmitted through a hub, said hub connected to the internet through one of wired and wireless connection to communicate to the remote communication device.

16. The method of communication of claim 15 wherein the hub has a charging station, and further comprising the step of recharging the device at the hub.

17. The method of communication of claim 1 wherein the material is human breastmilk and the first time relates to a storage time deemed safe to consume the human breastmilk within a first temperature range.

* * * * *